May 2, 1950     C. KESSES     2,506,222
CONTROLLING STICK FOR AIRPLANES
Filed April 18, 1946
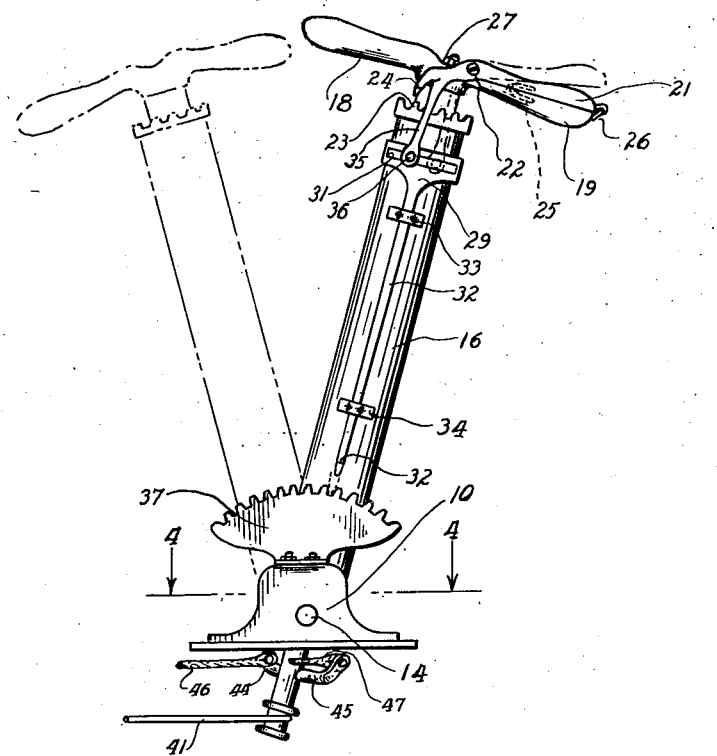
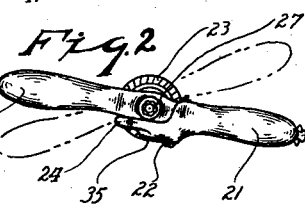
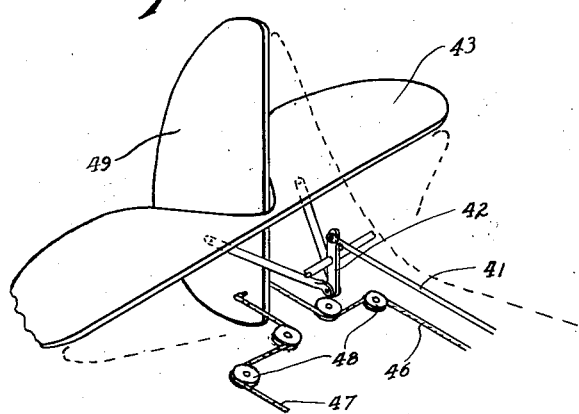
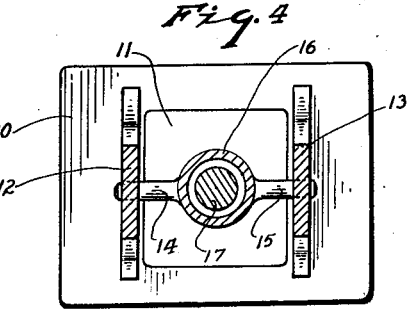
INVENTOR.
CHARLES KESSES
BY
L. S. Saulsbury
ATTORNEY Patented May 2, 1950

2,506,222

UNITED STATES PATENT OFFICE 2,506,222

CONTROLLING STICK FOR AIRPLANES

Charles Kesses, New York, N. Y.

Application April 18, 1946, Serial No. 663,185

2 Claims. (Cl. 244—83)

This invention relates to a controlling stick arrangement for aeroplanes.

It is an object of the present invention to provide a controlling stick for aeroplanes whereupon upon fore and aft movement an elevator can be adjusted and by the same handles with which the fore and aft movement is applied to the stick, a turning action can be effected upon the rudder to steer the aeroplane laterally.

Other objects of the present invention are to provide a controlling stick for aircraft having two different movements for the respective control members of the aircraft, which is of simple construction, inexpensive to manufacture, easy to install upon the aircraft, easy to operate, adapted to be locked in any position to lock the rudder and the elevator, and wherein the release can be effected by a simple compressing of a lever upon the handles to release the controls to adjust the controls of the aircraft, has a minimum number of parts, compact, sturdy and efficient in operation.

For other objects and for a better understanding of the invention, reference may be had to the following detailed description taken in connection with the accompanying drawing, in which Fig. 1 is a side elevational view of the control stick arrangement with the locking projections removed from the teeth abutments and free to be operated to control the aircraft.

Fig. 2 is a top plan view.

Fig. 3 is a perspective view of the rudder and elevator combination disposed at the rear of the aeroplane and of the connecting elements which connect the control stick arrangement with these control elements.

Fig. 4 is an enlarged transverse sectional view taken on line 4—4 of Fig. 1.

Referring now to the figures, 10 represents a base support adapted to be mounted into the body of the aircraft. This support has an opening 11 and laterally spaced upstanding projections 12 and 13. These projections provide bearings for trunnions 14 and 15, respectively, projecting laterally from the lower end of a tube 16, Fig. 4, whereby the tube can be adjusted fore and aft in order to effect the adjustment of the horizontal elevator.

Extending through the tube is a shaft 17. This shaft is journalled with the tube for rotational adjustment therewithin. The upper end of the shaft has handle projections 18 and 19 fixed thereto. The handle projection 19 is a half portion on which is pivotally connected a locking lever 21. A pivot pin 22 connects this locking lever 21 to the portion 19 for pivotal adjustment with respect thereto.

The upper end of the tube 16 has a series of spaced teeth 23 with which a latch projection 24 may engage upon the lever 21 being elevated by a spring 24. This lever will accordingly, through its projection 24, lock the shaft 17 against rotational adjustment relative to the tube 16 as at times when the control stick arrangement is not being used. When the stick arrangement is in use, the handle portion 21 is locked to the handle portion 19 by a hook latch device 26 on the ends of these portions. The handle portions are fixed to the shaft 17 by a nut 27.

Surrounding the tube 16 is a slotted curved member 29 having slot 31 and a long depending projection 32. Straps 33 and 34 hold this projection upon the tube for longitudinal displacement between elevated and lowered positions. The same lever 21 through a depending projection 35 and a pin 36 in the lower end of the same acts within the slot of the member 29 to raise and lower the projection 32. A tooth segment 37 is fixed upon the base 10. The projection 32 of the member 29 will engage with the tooth segment whereby to hold the tube in any one of a plurality of adjusted positions thereover. The projection 32 and the projection 24 are operated simultaneously so that both the tube 16 is held against fore and aft adjustment and the internal shaft 17 is held against rotational displacement.

The shaft 17 depends below the base 10 and its lower end is connected by a rigid rod or shaft 41 to a linkage 42 which is in turn connected to horizontal elevator 43 to adjust the same and vertically control the flight of the aeroplane.

The shaft 17 has two arms 44 and 45 which are connected by cable ropes 46 and 47, respectively, that extend rearwardly over pulleys 48, Fig. 3, and connect to a rudder 49 whereby to effect the lateral adjustment of the rudder about its vertical axis.

In operation, it would be seen that when the locking lever 21 is depressed and connected by the hook latch 26 to the portion 19, the control arrangement can be used to control both the elevator and the rudder by a simple movement. The elevator will be controlled by the fore and aft movement of the tube 16 while grasping the handle portions and the rudder will be controlled by rotating the handles and the shaft 17. Once the adjustment has been made and it is desired to fix the control parts in their adjusted positions, this can be done by a simple release of the hook latch 26 whereby the projection 24 will lock with the teeth 23 and the projection 32 will lock with the tooth segment 37.

While various changes may be made in the detail construction, it shall be understood that such changes shall be within the spirit and scope of the present invention as defined by the appended claims.

I claim:

1. A rudder and elevator control device for use on an aircraft structure, said device comprising a tubular member mounted on a pivot at its lower end to the fixed aircraft structure for fore and aft movement, a shaft rotatably mounted in said tubular member having a control handle at its upper end, means connecting the lower end of the shaft to the elevator and laterally extending arms on said shaft adjacent said pivot connected to the rudder, a rack attached to the fixed aircraft structure adjacent the lower end of said tubular member and a second rack attached to the upper end of said tubular member, a lever pivotally mounted on said control handle, means operatively connected to said lever in engagement with said racks when said lever is in one extreme position and out of engagement with said racks when said lever is in its other extreme position, spring means connected to the control handle and lever to bias said lever toward said first mentioned position and latch means on said control handle and lever to latch said lever in its second mentioned position to the control handle.

2. A rudder and elevator control device for use on an aircraft structure, said device comprising a tubular member mounted on a pivot at its lower end to the fixed aircraft structure for fore and aft movement, a shaft rotatably mounted in said tubular member having a control handle at its upper end, means connecting the lower end of the shaft to the elevator and laterally extending arms on said shaft adjacent said pivot connected to the rudder, and releasable locking means adjustably connected to the control handle and engageable with the tubular member and with the fixed aircraft structure to lock the shaft against rotation and the tubular member against fore and aft movement.

CHARLES KESSES.

REFERENCES CITED

The following references are of record in the file of this patent:

UNITED STATES PATENTS

| Number    | Name      | Date           |
|-----------|-----------|----------------|
| 1,190,374 | Capdevila | July 11, 1916  |
| 1,415,176 | Hughes    | May 9, 1922    |
| 1,889,295 | Rosatelli | Nov. 29, 1932  |
| 1,923,290 | Wood      | Aug. 22, 1933  |
| 2,112,755 | Back      | Mar. 29, 1938  |
| 2,220,315 | Conterio  | Nov. 5, 1940   |
| 2,222,204 | Newman    | Nov. 19, 1940  |
| 2,406,233 | Linnert   | Aug. 20, 1946  |
| 2,413,577 | Osborn    | Dec. 31, 1946  |

FOREIGN PATENTS

| Number | Country | Date          |
|--------|---------|---------------|
| 51,938 | Austria | Jan. 25, 1912 |